United States Patent
Wall et al.

(10) Patent No.: US 10,473,933 B2
(45) Date of Patent: Nov. 12, 2019

(54) WAVEGUIDE PUPIL RELAY

(71) Applicant: Microsoft Technology Licensing, LLC, Redmond, WA (US)

(72) Inventors: Richard Andrew Wall, Kirkland, WA (US); Tuomas Heikki Sakari Vallius, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 15/048,917

(22) Filed: Feb. 19, 2016

(65) Prior Publication Data

US 2017/0242249 A1 Aug. 24, 2017

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0031* (2013.01);
(Continued)

(58) Field of Classification Search
CPC ............ G02B 27/0172; G02B 27/0176; G02B 27/126; G02B 27/14; G02B 27/141; G02B 2027/0116; G02B 2027/015; G02B 2027/0101; G02B 6/0016; G02B 6/0031; G02B 6/0055
(Continued)

(56) References Cited

U.S. PATENT DOCUMENTS

| 4,152,045 A | * | 5/1979 | Hammer | G02B 6/34 |
| | | | | 385/130 |
| 4,711,512 A | * | 12/1987 | Upatnieks | G02B 27/0103 |
| | | | | 345/7 |

(Continued)

FOREIGN PATENT DOCUMENTS

| CN | 103995354 A | 8/2014 |
| CN | 104280885 A | 1/2015 |

(Continued)

OTHER PUBLICATIONS

Kessler, Dave, "Optics of Near to Eye Displays (NEDs)", In Proceedings of Oasis, Feb. 19, 2013, pp. 1-37.

(Continued)

*Primary Examiner* — Travis S Fissel
(74) *Attorney, Agent, or Firm* — Arent Fox LLP

(57) ABSTRACT

A waveguide-based pupil relay for an optical system can comprise a light-transmissive substrate that includes a plurality of internally reflective surfaces to enable light rays of a plurality of different colors to propagate through the substrate by total internal reflection. The pupil relay can further include an input surface to input light rays of the plurality of different colors through an entry pupil of the optical waveguide, and an output surface to output light rays of the plurality of different colors from the substrate through an exit pupil of the optical waveguide. The pupil relay can have optical properties such that the entry pupil and exit pupil have substantially identical size and shape and such that the input light rays and output light rays have substantially identical chromatic properties.

17 Claims, 11 Drawing Sheets

(52) U.S. Cl.
CPC ....... *G02B 6/0055* (2013.01); *G02B 27/0176* (2013.01); *G02B 2027/015* (2013.01); *G02B 2027/0116* (2013.01)

(58) Field of Classification Search
USPC ............................ 359/630–640, 861; 349/11
See application file for complete search history.

(56) References Cited

U.S. PATENT DOCUMENTS

| | | | |
|---|---|---|---|
| 4,746,179 A * | 5/1988 | Dahne ...................... | G02B 6/10 356/133 |
| 5,101,458 A * | 3/1992 | Spaulding ................ | G02B 6/34 385/36 |
| 6,608,961 B2 | 8/2003 | Travis | |
| 8,548,290 B2 * | 10/2013 | Travers ............. | G02B 27/0081 359/34 |
| 8,885,997 B2 | 11/2014 | Nguyen et al. | |
| 8,891,578 B2 | 11/2014 | Hatori et al. | |
| 2004/0013361 A1 | 1/2004 | Chen et al. | |
| 2005/0180687 A1 | 8/2005 | Amitai | |
| 2007/0188837 A1 | 8/2007 | Shimizu et al. | |
| 2010/0149073 A1 | 6/2010 | Chaum et al. | |
| 2010/0321781 A1 | 12/2010 | Levola et al. | |
| 2011/0242661 A1 * | 10/2011 | Simmonds ........... | G02B 6/0035 359/567 |
| 2014/0064655 A1 * | 3/2014 | Nguyen ............... | G02B 6/0076 385/11 |
| 2014/0140654 A1 | 5/2014 | Brown et al. | |
| 2014/0306878 A1 | 10/2014 | Bhakta | |

FOREIGN PATENT DOCUMENTS

| | | |
|---|---|---|
| EP | 2767853 A1 | 8/2014 |
| WO | 2011051660 A1 | 5/2011 |

OTHER PUBLICATIONS

International Search Report and Written Opinion dated May 16, 2017, in international Application No. PCT/US2017/017092, 15 Pages. (MS#358676-WO-PCT).

* cited by examiner

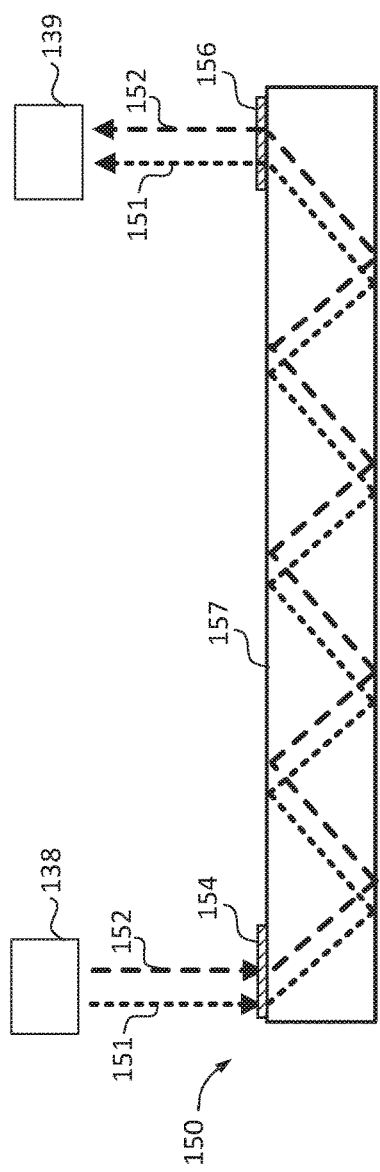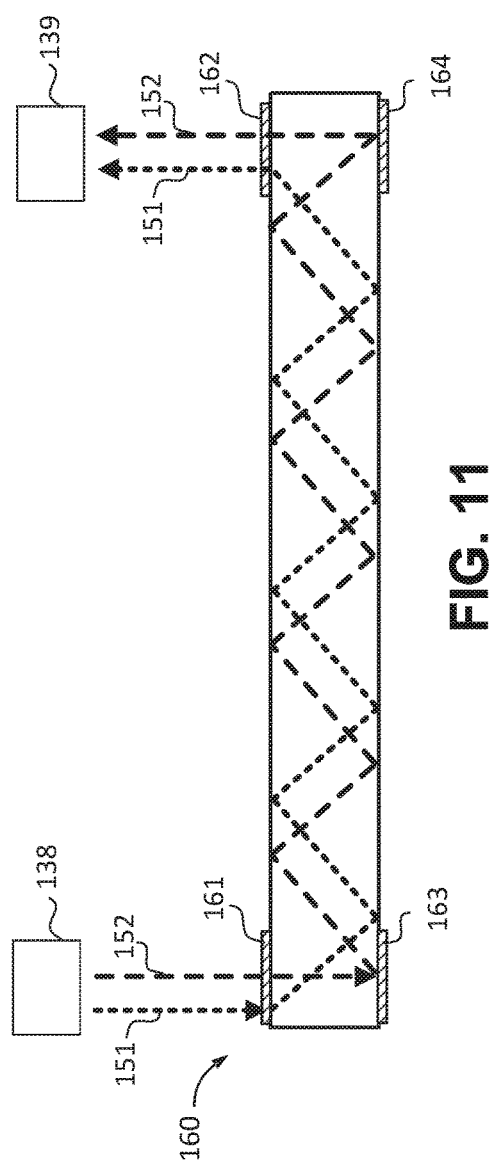

WAVEGUIDE PUPIL RELAY

BACKGROUND

A pupil relay system is used to spatially translate a pupil from one position to another in an optical system. Though a pupil relay system can be modeled with ideal paraxial lenses in optical design software, practical pupil relay systems such as the Offner-type relay tend to be very complex to correct for aberrations in the system and to ensure that the performance of the system does not degrade with that of the pupil relay. With their relatively large size and weight, the design of conventional pupil relays makes them poorly suited for use in head-mounted display (HMD) systems and other near-eye display systems. In addition, tolerances on these optical systems are usually too sensitive to permit mass-production of any included pupil relay in a cost-effective manner.

SUMMARY

Introduced here are at least one apparatus and at least one method (collectively and individually, "the technique introduced here" or simply "the technique") to spatially translate a pupil from one position to another in an optical system. The technique enables a pupil relay to be mass-produced in a cost-effective manner while complying with extremely tight tolerances.

In some embodiments the technique includes an optical waveguide comprising a light-transmissive substrate that includes a plurality of internally reflective surfaces to enable light rays of a plurality of different colors to propagate through the substrate by total internal reflection. The optical waveguide can further include an input surface to input light rays of the plurality of different colors through an entry pupil of the optical waveguide, and an output surface to output light rays of the plurality of different colors from the substrate through an exit pupil of the optical waveguide. The optical waveguide can have optical properties such that the entry pupil and exit pupil have substantially identical size and shape and such that the input light rays and output light rays have substantially identical chromatic properties.

In certain embodiments the technique may be implemented in a near-eye display device, such as an HMD device. In certain embodiments the technique may be implemented in conjunction with a technique for increasing the field of view (FOV) of displayed images in a display device, such as an HMD device.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 10 illustrates a waveguide pupil relay that includes diffractive optical elements (DOEs) according to a first embodiment.

FIG. 11 illustrates a waveguide pupil relay that includes DOEs according to a second embodiment.

DETAILED DESCRIPTION

Figure 1:
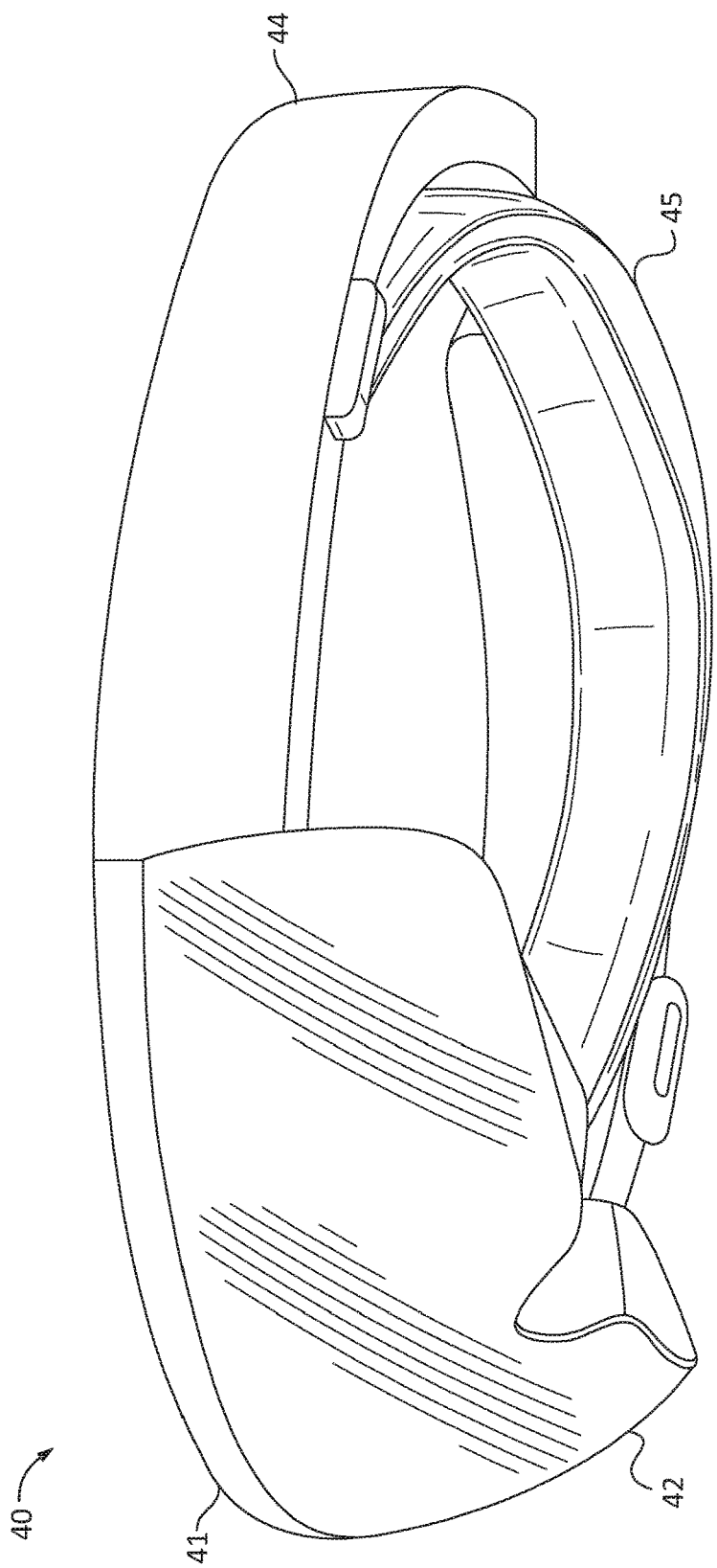
FIG. 1 shows an example of an HMD device that may incorporate the technique introduced herein.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The following description generally assumes that the "user" of a display device is a human, to facilitate description. Note, however, that a display device embodying the technique introduced here can potentially be used by a user that is not human, such as a machine or an animal. Hence, the term "user" herein can refer to any of those possibilities, except as may be otherwise stated or evident from the context. Further, the term "optical receptor" is used herein as a general term to refer to a human eye, an animal eye, or a machine-implemented optical sensor designed to detect an image in a manner analogous to a human eye.

Some artificial reality (AR) enabled HMD devices include one or more transparent waveguides arranged so that they are positioned to be located directly in front of each eye of the user when the HMD device is worn by the user, to project light representing generated images into the eye of the user. With such a configuration, images generated by the HMD device can be overlaid on the user's view of the real world.

The FOV of such an HMD display device may be limited, however, by the refractive index of the materials used to make the waveguides. This constraint can be mitigated by providing two or more input pupils/in-coupling elements on the waveguide for each eye of the user, which enables a significantly larger FOV to be achieved with currently available materials and manufacturing technology.

One way to accommodate the use of two or more in-coupling elements/pupils on a waveguide (per eye) would be to use two or more corresponding light engines for each eye. A light engine is a component assembly that includes one or more light sources (e.g., red, green and blue light sources), one or more microdisplay imagers, and associated optics. However, the use of multiple light engines for each eye increases weight, price and size significantly, which is undesirable in a small-footprint device such as an HMD device. Additionally, the mechanical alignment between multiple light engines is challenging, since the tolerances tend to be on the order of arc-seconds in order to provide adequate image quality. Therefore, the use of two light engines on a waveguide may not be desirable with existing technology.

The technique introduced here, however, overcomes this challenge in some embodiments by providing a switchable element in a light engine, to switch the direction of the image to at least two different optical paths, and pupil relay optics to transfer the pupil to another location. The relay optics can be placed after the switching element to transfer the image further away from the light engine, to enable larger distances between the in-coupling elements. This technique, therefore, enables a single light engine to provide two pupils for the image to two separate input ports on a waveguide, without significantly increasing the cost and size of the system, thereby greatly increasing the FOV with current materials and manufacturing technologies.

Another approach to solving this problem is to combine two or more microdisplay imagers in the same light engine. The same illumination and imaging optics can be used to produce two overlaying images, which can be separated using, for example, a polarization mirror. As with the approach mentioned above, pupil relay optics can be used to transfer any one or more of the pupils further away from the light engine, to enable the input ports on the waveguide to be located relatively far away from each other. Additional details regarding the technique introduced here are provided below.

FIG. 1 shows an example of an HMD device in which the technique introduced here can be incorporated. The HMD device 40 may provide virtual reality (VR) and/or augmented reality (AR) display modes for the user, i.e., the wearer of the device. To facilitate description, it is henceforth assumed that the HMD device 40 is designed for AR visualization.

In the illustrated embodiment, the HMD device 40 includes a chassis 41, a transparent protective visor 42 mounted to the chassis 41, and left and right side arms 44 mounted to the chassis 41. The visor 42 forms a protective enclosure for various display elements (not shown) that are discussed below.

The chassis 41 is the mounting structure for the visor 42 and side arms 44, as well as for various sensors and other components (not shown) that are not germane to this description. A display assembly (not shown) that can generate images for AR visualization is also mounted to the chassis 41 and enclosed within the protective visor 42. The visor assembly 42 and/or chassis 41 may also house electronics (not shown) to control the functionality of the display assembly and other functions of the HMD device 40. The HMD device 40 further includes an adjustable headband 45 attached to the chassis 41, by which the HMD device 40 can be worn on a user's head.

Figure 2A:
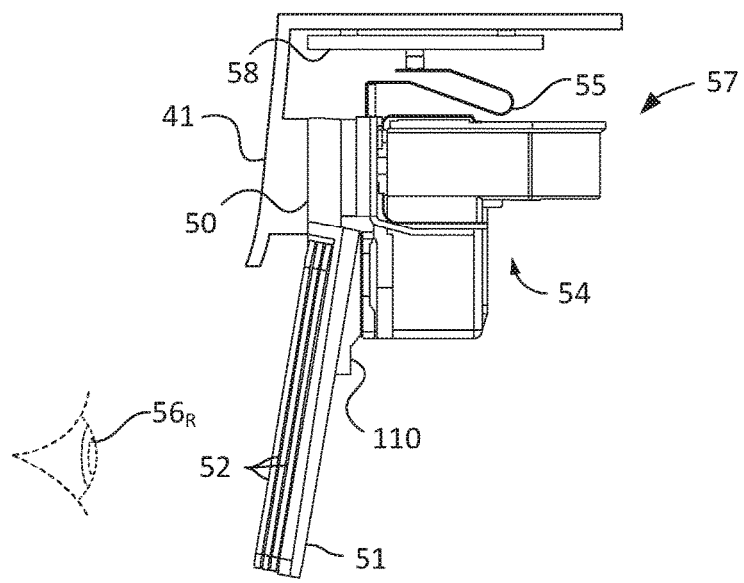
FIG. 2A shows a right side view of display components that may be contained within the HMD device of FIG. 1.
Figure 2B:
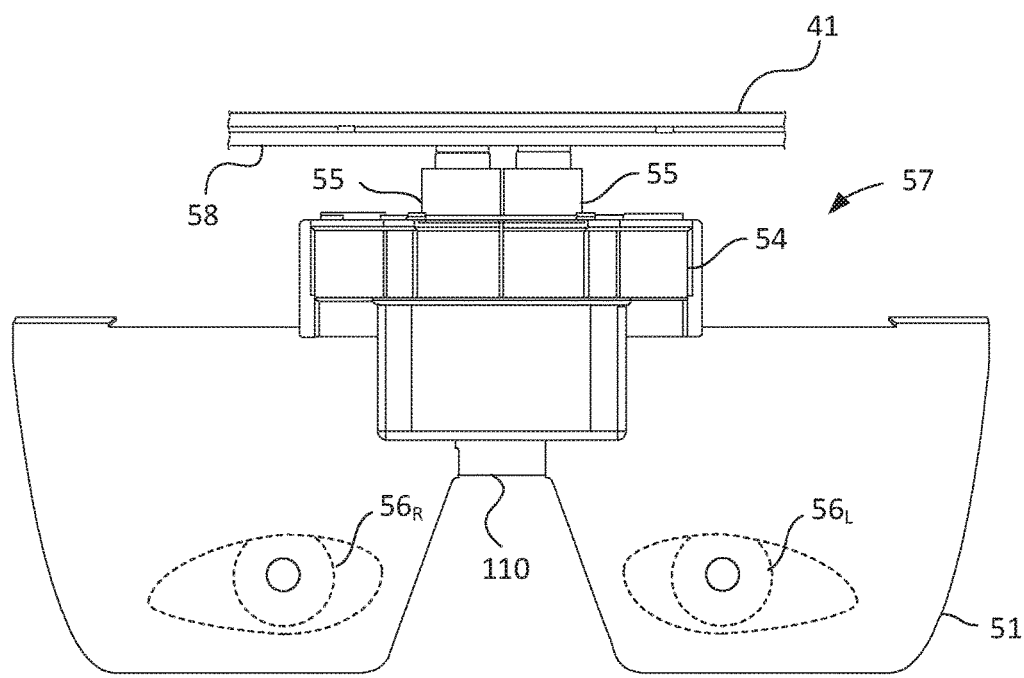
FIG. 2B shows a front view of display components that may be contained within the HMD device of FIG. 1.

FIGS. 2A and 2B show, in accordance with certain embodiments, right side and front orthogonal views, respectively, of display components that may be contained within the visor 42 of the HMD device 40. During operation of the HMD device 40, the display components are positioned relative to the user's left eye $56_L$ and right eye $56_R$ as shown. The display components are mounted to the interior surface of the chassis 41. The chassis 41 is shown in cross-section in FIG. 2A.

The display components are designed to overlay three-dimensional images on the user's view of his real-world environment, e.g., by projecting light into the user's eyes. Accordingly, the display components include a display module 54 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 54 may be connected via a flexible circuit connector 55 to a printed circuit board 58 that has image generation/control electronics (not shown) mounted on it.

The display components further include a transparent waveguide carrier 51 to which the display module 54 is mounted, and multiple transparent waveguides 52 stacked on the user's side of the waveguide carrier 51, for each of the left eye and right eye of the user. The waveguide carrier 51 has a central nose bridge portion 110, from which its left and right waveguide mounting surfaces extend. Multiple waveguides 52 are stacked on each of the left and right waveguide mounting surfaces of the waveguide carrier 51, to project light emitted from the display module and representing images into the left eye $56_L$ and right eye $56_R$, respectively, of the user. The display assembly 57 can be mounted to the chassis 41 through a center tab 50 located at the top of the waveguide carrier 51 over the central nose bridge section 110.

Figure 3:
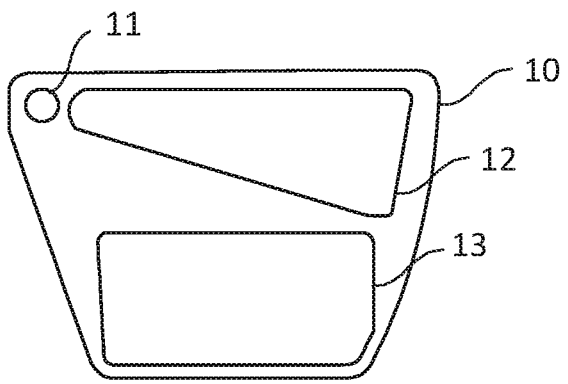
FIG. 3 shows a single input pupil waveguide to convey light to a particular eye of the user.

FIG. 3 shows a single input pupil design for a waveguide that can be mounted on the waveguide carrier 51 to convey light to a particular eye of the user, in this example, the right eye of user. A similar waveguide can be designed for the left eye, for example, as a (horizontal) mirror image of the waveguide shown in FIG. 3. The waveguide 10 is transparent and, as can be seen from FIGS. 2A and 2B, would normally be disposed directly in front of the right eye of the user during operation of the HMD device, e.g., as one of the waveguides 52 in FIG. 2A. The waveguide 10 is, therefore, shown from the user's perspective during operation of the HMD device 40.

The waveguide 10 includes a single input port 11 (also called in-coupling element, and corresponding to the single input pupil) located in the region of the waveguide 10 that is closest to the user's nose bridge when the HMD device 40 is worn by the user. The input port 11 may be formed from, for example, a surface diffraction grating, volume diffraction grating, or a reflective component. The waveguide 10 further includes a single output port 13 (also called out-coupling element) and a transmission channel 12. A right-eye output port of the display module (not shown) is optically coupled (but not necessarily physically coupled) to the input port 11 of the waveguide 10. During operation, the display module

54 (not shown) outputs light representing an image for the right eye from its right-eye output port into the input port 11 of the waveguide 10.

The transmission channel 12 conveys light from the input port 11 to the output port 13 and may be, for example, a surface diffraction grating, volume diffraction grating, or a reflective component. The transmission channel 12 may be designed to accomplish this by use of total internal reflection (TIR). Light representing the image for the right eye is then projected from the output port 13 to the user's eye.

Figure 4:
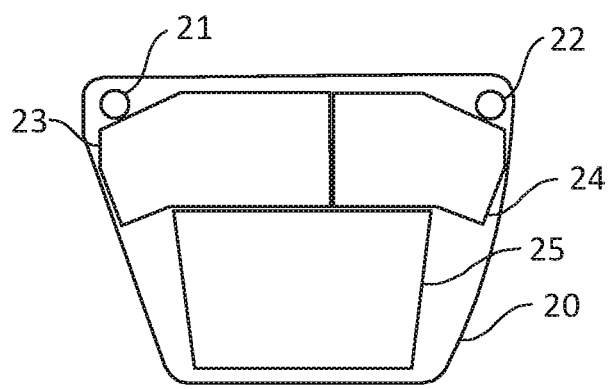
FIG. 4 shows a multiple input pupil waveguide to convey light to a particular eye of the user.

As mentioned above, however, the single input port design shown in FIG. 3 has a relatively limited FOV. FIG. 4, therefore, shows a dual-input pupil design for a waveguide, which can be used instead of the waveguide in FIG. 3 to provide a greater FOV. Note that while the present disclosure describes waveguides with one or two input ports/pupils and a single output port/pupil, a display device incorporating the technique introduced here may have a waveguide with more than two input ports/pupils and/or more than one output port/pupil for a given eye. Further, while the example of FIG. 4 is for the right eye, a similar waveguide can be designed for the left eye, for example, as a (horizontal) mirror image of the waveguide in FIG. 4.

As shown, the waveguide 20 in FIG. 4 includes two separate input ports 21 and 22, two transmission channels 23 and 24, and an output port 25. During operation, each of the input ports 21, 22 receives light (from the display module 54) representing a different portion of the image for the right eye of the user. Each of the transmission channels 23, 24 is optically coupled to a separate one of the input ports 21 or 22 and conveys light from only the corresponding input port 21 or 22 to the output port 25. Each of the transmission channels 23, 24 may be, for example, an internal or surface diffraction grating design to channel light by TIR. Light from the two different portions of the image is combined at the output port 25 and projected into the eye of the user as a single integrated image.

In some embodiments, the left input port 21 receives the left portion (e.g., half) of the image for one eye of the user (e.g., the right eye) while the right input port 22 receives the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 20 could have more than two input ports, in which case the image could be provided to the waveguide 20 in the form of three or more separate image portions, which are reintegrated in the waveguide 20.

Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 4. For example, the input ports could be spaced apart vertically on the waveguide rather than, or in addition to, horizontally. Other input port configurations are also possible.

Figure 5:
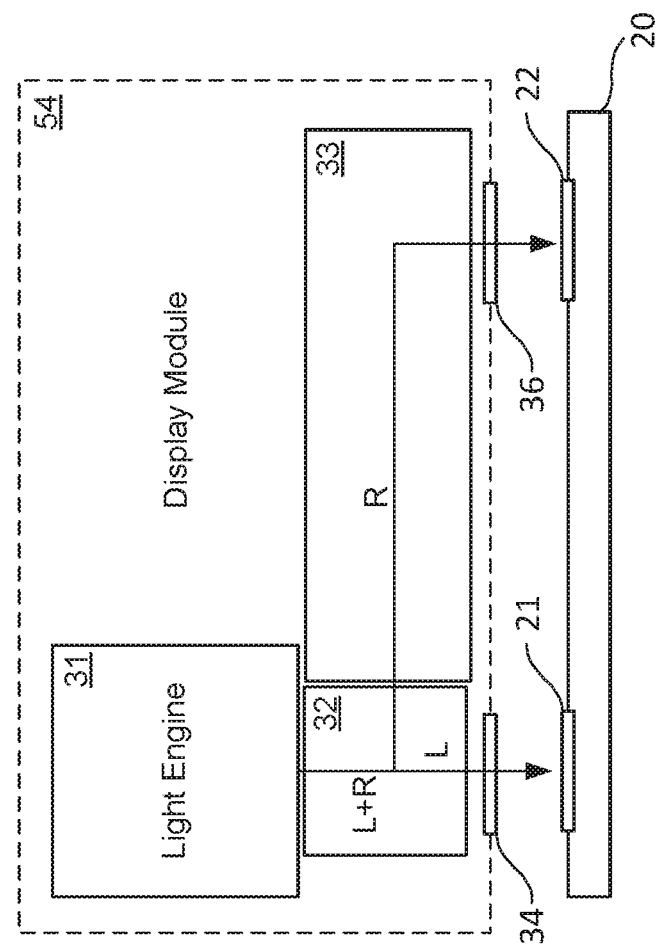
FIG. 5 schematically shows an example of relevant components of the display module for one eye of the user, usable in connection with the multiple input pupil waveguide in FIG. 4.

As mentioned above, one possible way to employ a dual input pupil waveguide, such as shown in FIG. 4, would be to use multiple light engines, i.e., one light engine for each input pupil. However, that approach has disadvantages, as discussed above. FIG. 5 illustrates an alternative approach that does not have the disadvantages of multiple light engines. In particular, FIG. 5 schematically shows an example of certain relevant components of the display module 54 for one eye of the user (left or right), that may be used in connection with a dual input pupil waveguide such as shown in FIG. 4. The view in FIG. 5 is from directly above the display module 54, looking down.

In the example of FIG. 5, the display module 54 includes a light engine 31, an optical switch 32 and a pupil relay 33. Though not shown, the display module 54 may also include similar or identical components for the other eye of the user. In some embodiments, the light engine 31 includes one or more light sources (not shown), such as one or more colored LEDs. For example, the light engine 31 can include red, green and blue LEDs to produce the red, green and blue color components, respectively, of the image. Additionally, the light engine 31 includes at least one microdisplay imager (not shown), such as an LCOS imager, LCD or DMD; and may further include one or more lenses, beam splitters, waveguides, and/or other optical components (not shown).

The optical switch 32 controls the propagation direction of the light output by the light engine 31, representing each particular portion of the image, to one of two different optical paths. In the illustrated embodiment, the first path is for the left half of the image and leads to an output port 34 of the display module 54 that is coupled to one corresponding input port 21 of the waveguide 20. The other optical path is for the right portion of the image and includes a pupil relay 33, which propagates that portion of the image to a second output port 36 of the display module 54, which is optically coupled to a second corresponding input port 22 of the waveguide 20.

The optical switch 32 selectively controls the propagation direction of light from the light engine 31 based on a switching criterion, such as polarization. For example, one half of the image may have s-polarization while the other half of image has p-polarization, where the optical switch 32 conveys s-polarized light along one optical path and conveys p-polarized light along the other optical path. The switch 32 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths.

The pupil relay 33 is optional but enables larger distances between the input ports 21, 22 on the waveguide 20. The pupil relay 33 may be constructed using any known or convenient method and materials for transferring an image pupil from one location to another. For example, the pupil relay 33 may be constructed from a sequence of paraxial lenses that focus the pupil to an intermediate image and then collimate it, followed by a mirror to redirect the light into the corresponding input port of the waveguide. The approach shown in FIG. 5, therefore, enables a single light engine to provide two pupils for an image to two separate in-coupling elements on a waveguide, without significantly increasing the cost and size of the system, thereby greatly increasing the FOV with current materials and manufacturing technologies.

Figure 6:
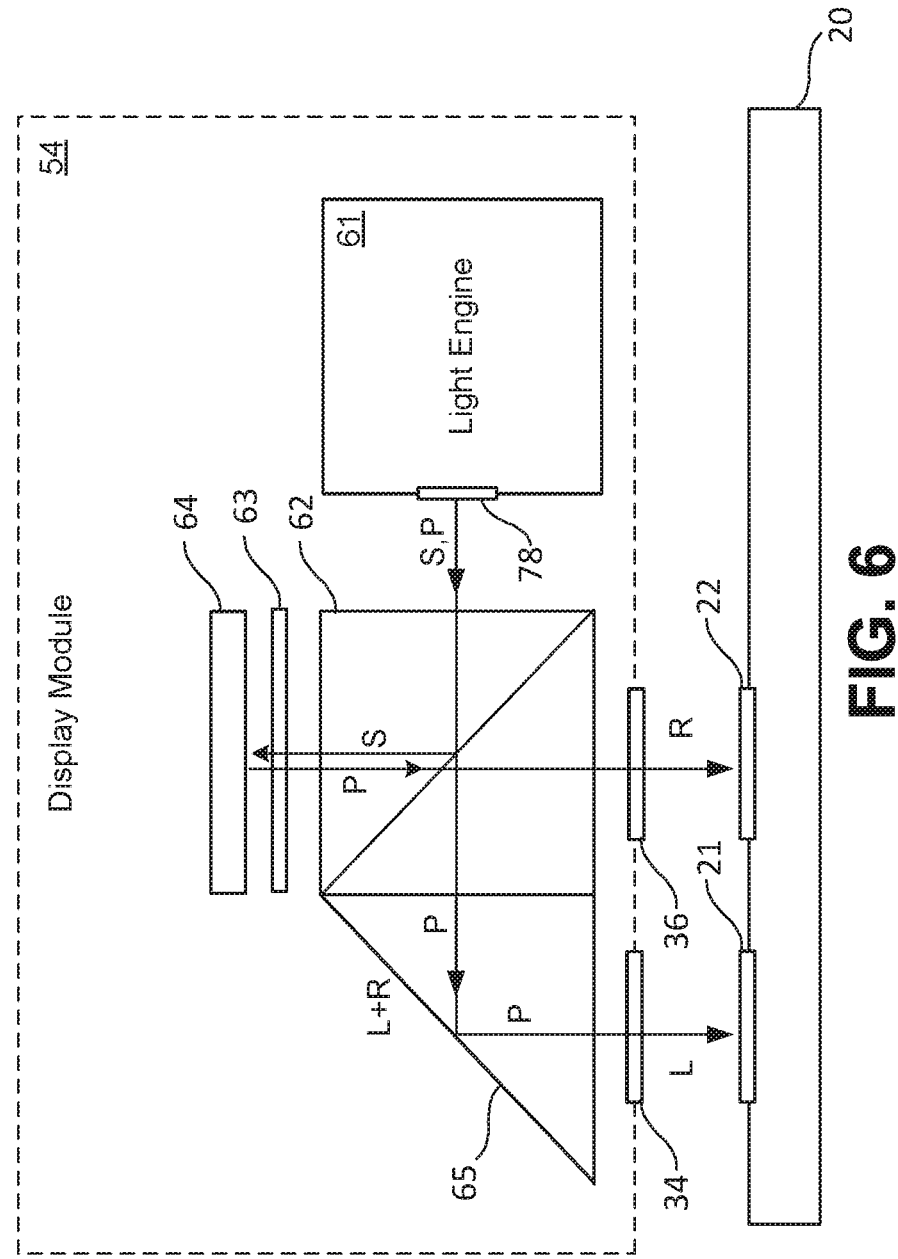
FIG. 6 schematically shows an example of relevant components of the display module for one eye of the user, usable in connection with the multiple input pupil waveguide in FIG. 4, for an embodiment that uses a light engine containing multiple imagers.
Figure 7:
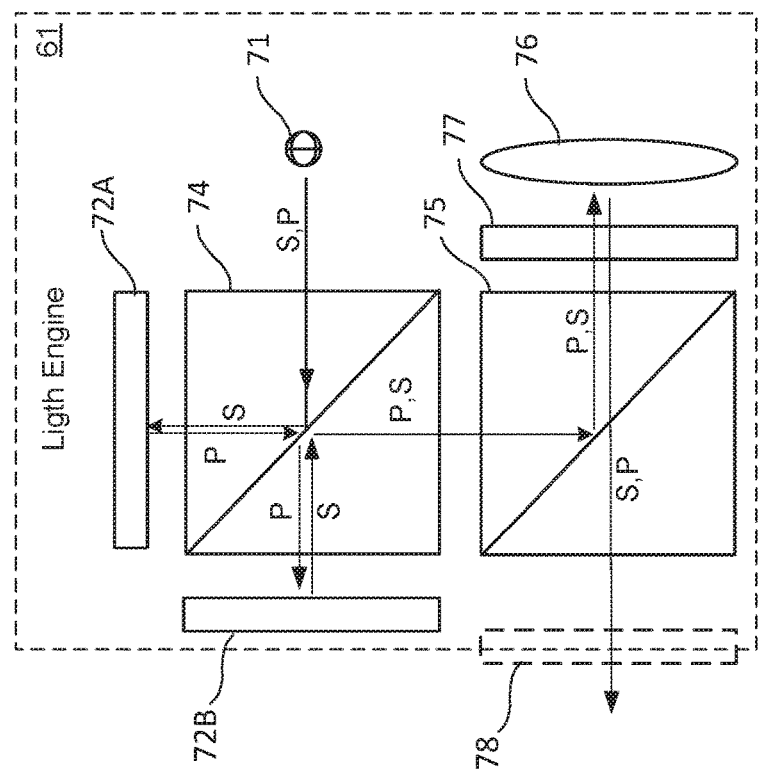
FIG. 7 schematically illustrates an example of relevant components of the light engine of FIG. 6.

FIGS. 6 and 7 illustrate another embodiment that uses multiple input pupils on a waveguide, in which two (or more) microdisplay imagers are combined in the same light engine. Specifically, FIG. 6 schematically shows an example of certain relevant components of the display module 54 for such an embodiment. The view in FIG. 6 is from directly above the display module 54, looking down.

As shown, the same illumination and imaging optics can be used to produce two overlaying portions of an image, which can be separated using, for example, a polarizing beam splitter (PBS). The left and right portions of the image are initially separated within the light engine 61 into p-polarized and s-polarized light, respectively. Then, additional optics route these two portions of the image to the appropriate output port 34 or 36 of the display module 54, which are optically coupled to corresponding input ports 21 and 22, respectively, of the waveguide 20. Specifically, a PBS 62 in combination with a quarter-wave plate (retarder) 63 and polarization mirror 64 cause the initially s-polarized right portion of the image to be converted to p-polarized light that is directed to the right output port 36 of the display module 54, and from there, into the right input port 22 of the waveguide 20. Also, the PBS 62 in combination with prism 65 causes the initially p-polarized left portion of the image to be directed to the left output port 34 of the display module 54, and from there, into the left input port 21 of the waveguide 20. As with the approach described above, pupil relay optics optionally can be used to transfer any one or more of the pupils further away from the light engine 61, to enable the input ports 21, 22 on the waveguide 20 to be located relatively far away from each other (e.g., as shown in FIGS. 4 and 5.

FIG. 7 schematically illustrates an example of certain relevant components of the light engine 61 of FIG. 6, according to certain embodiments. The view in FIG. 7 is from the right side of the display module 54. Note that some embodiments may include other active and/or passive components, not shown. The light engine 61 in the illustrated embodiment includes at least one light source 71, such as a color LED. Although only one light source 71 is shown in FIG. 7, in practice there may be multiple light sources provided for each eye of the user, e.g., one for each color component of whatever color model is being employed (e.g., red, green and blue). The same or a similar configuration as shown in FIG. 7 can be used to combine light from such multiple light sources.

The light engine 61 further includes multiple imagers (e.g., LCOS microdisplays) 72A and 72B that generate separate portions of an image intended for display to a particular eye of the user. The two imagers 72A, 72B can be identical in size, functionality, etc. A retarder (e.g., quarter-wave plate) can be placed before the waveguide at one of the waveguide inputs to have optimum polarization entering the waveguide.

Additionally, the light engine 61 includes a combination of PBSs 74, 75, one or more reflective lenses 76 and one or more quarter-wave plates 77, that generates the separate portions of the image and propagates them simultaneously through the output port 78 of the light engine 61. More specifically, a first PBS 74 reflects s-polarized light from the light source 71 upward to a first microdisplay imager 72A, which generates one portion of the image. The PBS 74 also causes p-polarized light from the light source 71 to be propagated straight through to the other microdisplay imager 72B, which produces a second portion of the image. Both portions of the image (separately constituting s-polarized and p-polarized light) then propagate downward through the PBS 74 to a second PBS 75, which directs them to birdbath-shaped reflective lenses 76 via quarter-wave plates (retarders) 77. The image portions are then reflected back by the reflective lenses 76 through the quarter-wave plates 77 and then through the PBS 75. From there, the image portions are output through the output port 78 of the light engine 61 and provided to additional optics in the display module 54, as shown by the example in FIG. 6.

Figure 8:
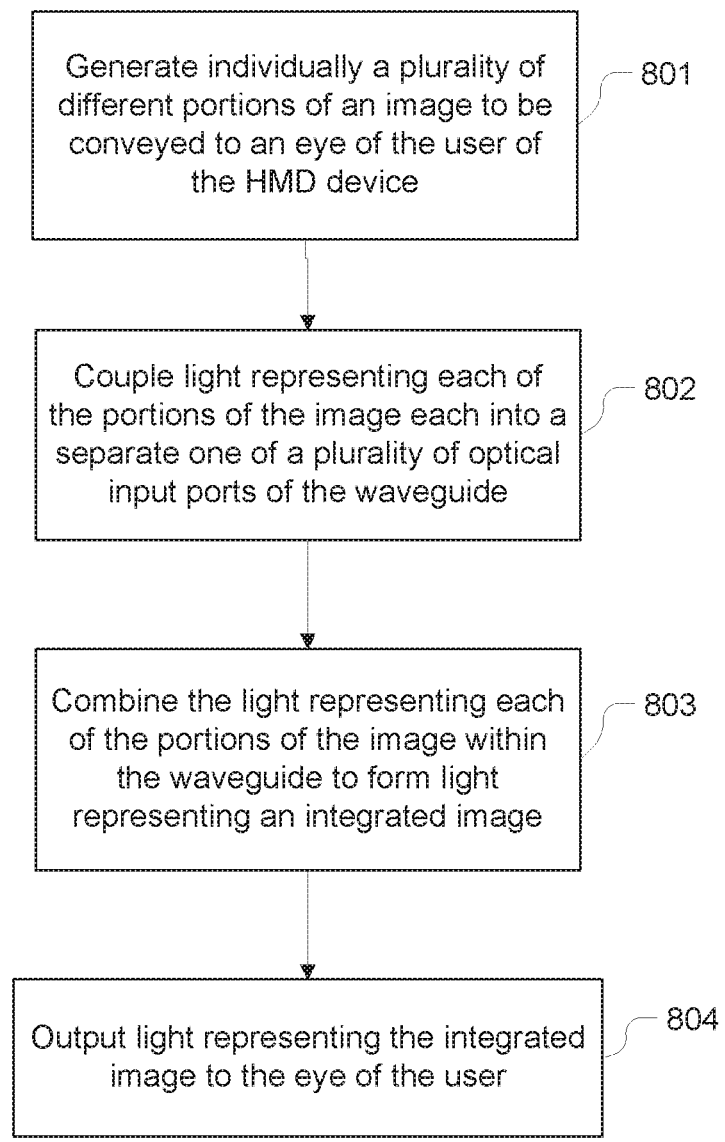
FIG. 8 illustrates an example of a method of using multiple input pupils on a waveguide in an HMD device.

FIG. 8 illustrates an example of a method of using multiple input pupils on a waveguide in an HMD device. The method begins at step 801 with generating individually a plurality of different portions of an image to be conveyed to an eye of the user of the HMD device. Next, light representing each portion of the image is coupled into a separate one of a plurality of optical input ports of the waveguide at step 802. At step 803, the light representing the multiple portions of the image is combined within the waveguide to form light representing an integrated image. Light representing the integrated image is then output from the waveguide to the eye of the user at step 804.

In certain embodiments described above, a pupil relay (e.g., pupil relay 33 in FIG. 5) is used to spatially transfer the pupil from one location to another. A pupil relay may also be desirable for other purposes in an HMD device and/or in other types of products or applications. Conventional pupil relay systems, however, such as the Offner-type relay, tend to be very complex to correct for aberrations in the system and to ensure that the performance of the system does not degrade with that of the pupil relay. With their relatively large size and weight, the design of conventional pupil relays makes them poorly suited for use in HMD systems and other near-eye display systems, and tolerances on such systems are usually too sensitive to permit mass-production of any included pupil relay in a cost-effective manner. To achieve a low-cost, tolerance-insensitive pupil relay would be useful for consumer electronics products with a need for multiple pupils or a single spatially translated pupil in an optical system.

Introduced here, therefore, is a pupil relay that overcomes the above-mentioned problems and is suitable for use in an HMD device or other type of near-eye display device or system. The pupil relay can be a waveguide with optical properties such that the entry pupil and exit pupil of the waveguide have substantially identical size and shape, and such that polychromatic light rays input to the pupil relay propagate collinearly through the pupil relay by TIR, so that the corresponding output light rays have substantially identical chromatic properties to those of the input light rays; that is, the pupil relay is achromatic. In this context, "substantially identical" means that there is no perceivable difference in these properties to a human user. The waveguide pupil relay introduced in the following description can be employed in an HMD device or other type of near-eye display device, for example as pupil relay 33 in FIG. 5, and/or for other purposes described herein.

Waveguides have traditionally been used to expand pupils over a specific distance, but not to spatially translate a pupil without modification. Furthermore, waveguides generally require their parameters to be tuned to specific angles and wavelengths. Additionally, waveguides traditionally have been used as pupil expanders only for single colors, not for expanding (or spatially translating) a multi-color pupil.

Conventionally, in waveguide-based optical elements such as pupil expanders, light rays of different colors propagate at different angles inside the substrate. A waveguide pupil relay such as introduced here, however, enables rays of different colors to propagate collinearly through the pupil relay, i.e., the pupil relay is achromatic. Unlike traditional optics that focus the pupil to an intermediate image plate then recollimate the light, a waveguide pupil relay such as introduced here can propagate the light through its length by TIR, resulting in the same pupil characteristics at the waveguide's output as at the input. The waveguide can be constructed by use of injection-molding according to current manufacturing technique, for example, to produce a faceted waveguide that achromatically relays the pupil.

Figure 9A:
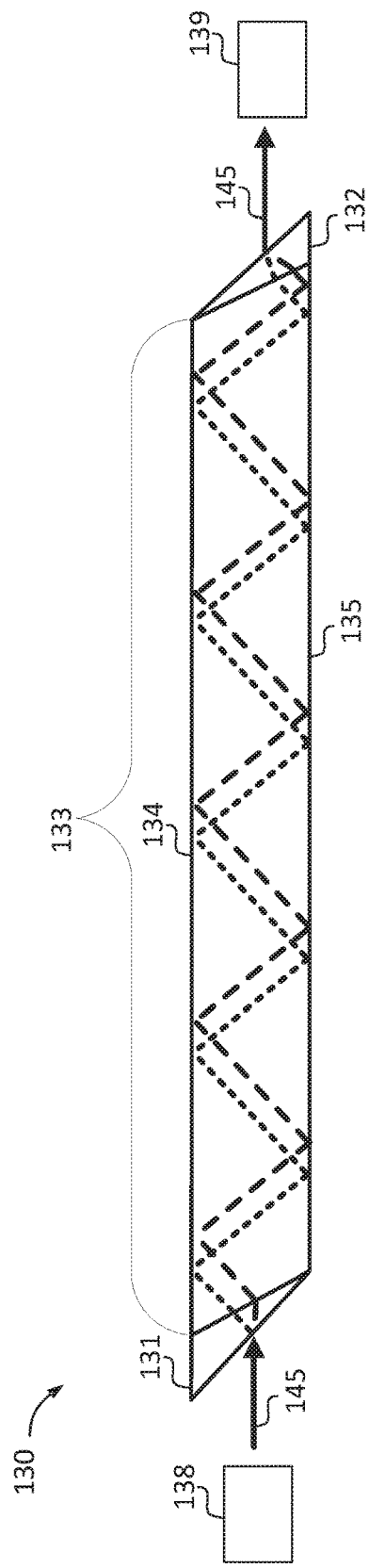
FIG. 9A illustrates a waveguide pupil relay with faceted ends.

In certain embodiments, an example of which is shown in FIG. 9A, a waveguide pupil relay 130 includes faceted (wedge-shaped) input and output couplers 131 and 132 to correct for chromatic displacements due to refraction. In particular, by incorporating a thin triangular prism ("wedge") coupler 131, 132 at both the input end and output end of the pupil relay 130, the waveguide pupil relay 130 corrects for the different refraction angles of different colors, e.g., red and green. Polychromatic light 145 is received through an input pupil 138 at the input end of the waveguide pupil relay 130 and is output at the output end via an exit pupil 139. The exit pupil 139 has the same size, shape and chromatic properties as the entry pupil 138. Note that while rays of only two colors are illustrated, the same principle can be applied in similar manner to propagate three or more colors through a waveguide pupil relay. Since blue is mostly invisible to humans in the periphery of the FOV, this very low-cost pupil relay can be used in, for example, a dual-color (e.g., red-green) peripheral vision system in an HMD and/or other applications where very high quality imaging is unnecessary. In other applications, the principles introduced here be used to produce a pupil relay that spatially translates a pupil with three or more colors (e.g., red, green and blue in an RGB color model) and/or in applications that require high-quality imaging.

In the illustrated embodiment, the waveguide 130 includes a substrate 133 that has a top surface 134 and a bottom surface 135 that are parallel to each other and that are internally reflective so as to provide TIR of light rays propagating within the substrate 133. As shown in FIG. 9A and further illustrated in FIGS. 9B and 9C, the substrate 133 further has slanted light transmission surfaces 136 and 137 at its input and output ends that are parallel to each other but that are neither parallel nor perpendicular to the top surface 134 and bottom surface 135. That is, the light transmission surfaces 136 and 137 are oriented at oblique angles relative to the top surface 134 and bottom surface 135 of the substrate 133.

In addition to the substrate 133, the waveguide also includes an input wedge coupler 131 (FIG. 9B) that has a surface physically and optically coupled to the first light transmission surface 136 of the substrate 133, and includes an output wedge coupler 132 that has a surface physically and optically coupled to the second light transmission surface 137 of the substrate 133. The substrate 133 and the wedge couplers 131 and 132 can each be made of a rigid, light-transmissive material, such as any of various types of optical grade glass or plastic. In certain embodiments, the substrate 133 is a single piece of such material. However, in some embodiments, the wedge couplers 131 and 132 may be of different material than the substrate 133 (e.g., one may be crown glass while the other is flint glass), to facilitate the collinear propagation of light, i.e., by taking advantage of their different indices of refraction in applying Snell's law.

The input wedge coupler 131 has an outer surface 141 that is the overall input surface of the waveguide 130, and has another surface opposite to the input surface 141, that is physically and optically coupled to the first light transmission surface 136 of the substrate 133. The output wedge coupler 132 has an outer surface 142 that is the overall output surface of the waveguide 130, and has another surface opposite to the output surface 142, that is physically and optically coupled to the second light transmission surface 137 of the substrate 133. The outer surfaces of the input wedge 131 and the output wedge 132 (i.e., the input surface 141 and the output surface 142 of the waveguide pupil relay 130) are each oriented at oblique angles relative to the top and bottom surfaces 134, 135 of the substrate 133 and relative to the first and second light transmission surfaces 136, 137 of the substrate 133, as further illustrated in FIGS. 9B and 9C. In at least some embodiments, the input wedge coupler 131 and the output wedge coupler 132 are identical to each other in size, shape and material, but have opposite orientations in the vertical axis when integrated with the rest of the pupil relay 130. In other embodiments, the input wedge coupler 131 and output wedge coupler 132 may be non-identical to each other in size, shape and/or material.

The wedge couplers 131 and 132 can be used to achromatically correct light propagation by decreasing the dispersion/angular separation of multi-wavelength light refracted into the system. The wedge couplers' internal angles $\phi 1$, $\phi 2$ and $\phi 3$ are chosen as a function of the wavelengths to be propagated through the pupil relay 130, and dispersion can be compensated with the proper selection of materials based on their Abbe numbers and partial dispersion ratios.

Figure 9B:
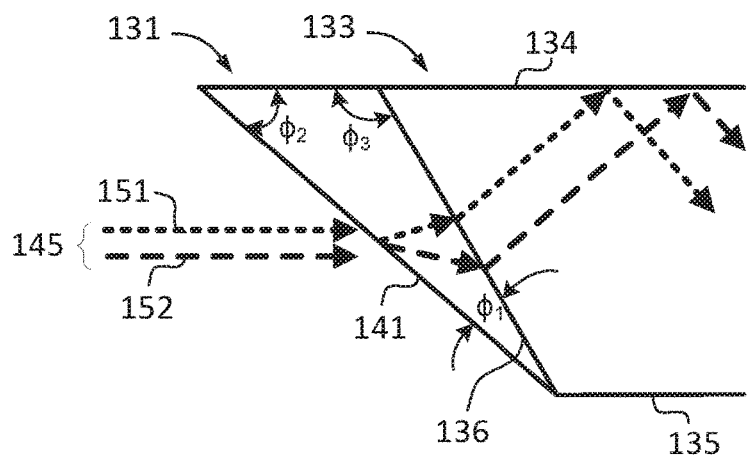
FIG. 9B illustrates a zoomed view of the input end of the waveguide pupil relay of FIG. 9A.

Referring to FIG. 9B, light rays containing multiple colors (where different-type dashed lines each represent a different color in the figures) initially strike the input surface 141 of the pupil relay 130. With a desired internal propagation angle (collinear for both colors), by application of Snell's law during the design phase, one can appropriately select the indices of refraction of the input wedge coupler 131 and the substrate 133 independently, and can select the slant angle on each face of the wedge coupler 131, to separate the two (or more) colors in the input wedge coupler 131 and then recombine them collinearly into the substrate 133. For example, the rays 151 and 152 of two (or more) different colors (e.g., red and green) in polychromatic input light 145 are refracted at the input surface 141 into the wedge coupler 131 at different angles. In other words, light rays 151 of one color are transmitted into the input wedge coupler 131 at one angle and light rays 152 of another color are transmitted into the wedge coupler 131 at a different angle. However, the wedge coupler 131 can be constructed to have specific angles and/or materials such that when the light rays 151 and 152 strike the opposite surface of the wedge coupler, i.e., the internal interface formed at surface 136, they are again differently refracted, as a result of which the rays 151 and 152 are transmitted collinearly into the substrate 133 and thereafter propagate collinearly through the substrate 133 by TIR.

Figure 9C:
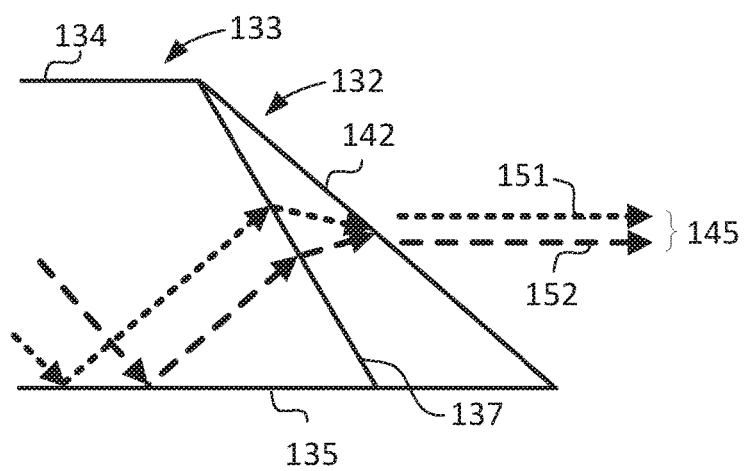
FIG. 9C illustrates a zoomed view of the output end of the waveguide pupil relay of FIG. 9A.

Similarly, referring now to FIG. 9C, at the output end of the waveguide pupil relay 130, light rays 151 and 152 of different colors propagating collinearly through the substrate 133 strike internal interface formed by the joining of the substrate at surface 137 to the output of wedge coupler 132. There the rays 151 and 152 are refracted at different angles into the output wedge coupler 132, such that they are no longer propagating collinearly. However, the angles and/or material of the output wedge coupler 132 are chosen such that upon exiting the output wedge coupler 132 at the output surface 142, the rays 151 and 152 of different colors are recombined and propagating collinearly. Consequently, the exit pupil 139 has the same size and chromatic properties as the input pupil 138.

In some embodiments, instead of (or in addition to) using faceted ends, a waveguide pupil relay may include one or more DOEs in conjunction with high index-of-refraction materials, to collinearly propagate colors from different diffracted modes. Examples of such an embodiment are shown in FIGS. 10 and 11. As with the embodiment described above, these embodiments also spatially translate the pupil so that the entry and exit pupils have substantially identical size, shape and chromatic properties.

In FIG. 10, instead of faceted ends, a waveguide pupil relay 150 includes two high-aspect-ratio surface relief diffraction gratings 154 and 156 as DOEs (one on the input end and one on the output end), formed as part of or proximate to a given surface 157 of the substrate of the pupil relay 150 (i.e., a surface parallel to the direction of propagation of the light rays within the substrate, shown as the top surface of the pupil relay 150 in FIG. 10). In this description, "proximate to" means no deeper than one micrometer from the surface. It may be desirable to make the depth of each DOE relatively large compared to its period. The DOEs 154 and 156 are designed to cause light rays of different colors to propagate collinearly through the pupil relay substrate and to continue to propagate collinearly upon exiting the pupil relay 150, respectively. If the pupil relay 150 is formed by an injection molding process, the DOEs 154 and 156 can be formed as part of or after that injection molding process. For example, in various embodiments, the DOEs 154 and 152 may be stamped into the surface of the pupil relay 150 during or after the injection molding process.

FIG. 11 shows another way of combining multiple colors into a single waveguide by using diffraction gratings. In FIG. 11, the pupil relay 160 includes at least four diffraction gratings 161 through 164 formed in or proximate to two opposite surfaces of the substrate that are parallel to the direction of propagation of the light rays within the substrate (shown as the top and bottom surfaces of the pupil relay 160 in FIG. 11). The diffraction gratings 161 and 162 on one surface (e.g., top surface) of the pupil relay couple a first color, and the diffraction gratings 163 and 164 on the opposite surface (e.g., bottom surface) of the pupil relay couple a second color. This can be done using, for example, diffraction gratings that work only on one polarization (colors have orthogonal polarizations) or using switchable diffraction gratings to enable selection of the coupled color for each diffraction gating. As mentioned above, the same principle can be applied to allow collinear propagation of three or more colors through the pupil relay in the embodiments of FIGS. 10 and 11.

In the embodiments of FIGS. 10 and 11, each of the DOEs 151, 152 161-164 can be part of a surface of the substrate of the pupil relay, or can be buried within the substrate. Hence, the light input surface and light output surface of the pupil relay 150 or 160, respectively, are each a DOE, or a portion of the substrate surface directly over a DOE if the DOE is buried below the surface. It can be assumed that each DOE in the pupil relay is substantially coplanar with at least one of the surfaces of the substrate that are parallel to the long axis of the pupil relay (i.e., each DOE is parallel to such surface and within one micrometer of depth of such surface).

In some embodiments, DOEs can be used in conjunction with one or more faceted ends in a waveguide pupil relay. Hence, aspects of the embodiments of FIGS. 10 and 11 can be combined with aspects of the embodiments of FIGS. 9A, 9B and 9C. For example, one or more DOE use could be formed in or proximate to the input surface and/or output surface in the faceted and embodiment of FIGS. 9A, 9B and 9C.

Figure 12:
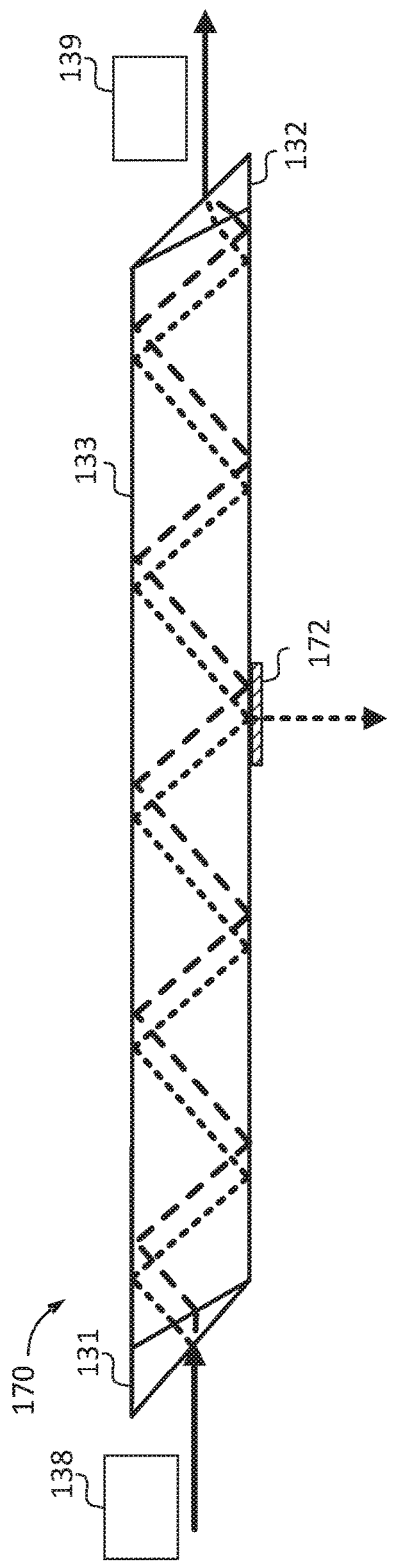
FIG. 12 illustrates a waveguide pupil relay that includes a DOE positioned intermediately along a length of the waveguide to out-couple light, according to a first embodiment.
Figure 13:
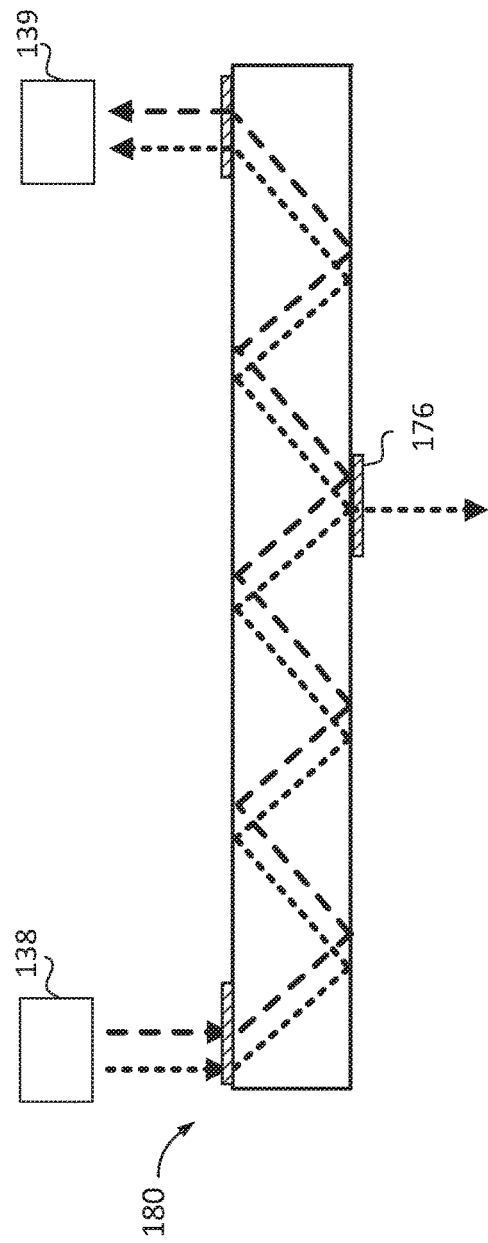
FIG. 13 illustrates a waveguide pupil relay that includes a DOE positioned intermediately along a length of the waveguide to out-couple light, according to a second embodiment.

As another example, and as shown in FIGS. 12 and 13, one or more DOEs (e.g., diffraction gratings) can be positioned at intermediate points along the waveguide to outcouple light of a particular wavelength or wavelengths, such as to provide a tertiary pupil. One or more such DOEs placed along the waveguide can out-couple single or multiple colors at specific angles. FIG. 12 shows a faceted-end embodiment similar to that in FIG. 9A, but further including a DOE 172 positioned intermediately along the length of the substrate 133, for out-coupling light of a particular color or colors. FIG. 13 shows a waveguide pupil relay 180 similar to that shown in FIG. 10 but further including a DOE 176 positioned intermediately along the length of the substrate, for out-coupling light of a particular color or colors. A similar modification can be made to the embodiment of FIG. 11.

EXAMPLES OF CERTAIN EMBODIMENTS

Certain embodiments of the technology introduced herein are summarized in the following numbered examples:

1. An optical waveguide comprising: a light-transmissive substrate that includes a plurality of internally reflective surfaces to enable light rays of a plurality of different colors to propagate through the substrate by total internal reflection; an input surface to input light rays of the plurality of different colors through an entry pupil of the optical waveguide; and an output surface to output light rays of the plurality of different colors from the substrate through an exit pupil of the optical waveguide, the optical waveguide having optical properties such that the entry pupil and exit pupil have substantially identical size and shape and such that the input light rays and output light rays have substantially identical chromatic properties.

2. The optical waveguide of example 1, wherein the substrate is rigid.

3. The optical waveguide of example 1 or example, the optical waveguide having physical dimensions such that the optical waveguide is suitable for use in a near-eye display device.

4. The optical waveguide of any of examples 1 through 3, the optical waveguide having optical characteristics such that the light rays of the plurality of different colors propagate collinearly through the waveguide substrate.

5. The optical waveguide of any of examples 1 through 3, the optical waveguide having optical characteristics such that the light rays of at least some of the plurality of different colors propagate non-collinearly through the waveguide substrate.

6. The optical waveguide of any of examples 1 through 5, wherein the plurality of different colors include at least three colors of a primary color model.

7. The optical waveguide of any of examples 1 through 6, wherein at least one of the input surface or the output surface is oriented at an oblique angle relative to the plurality of internally reflective surfaces.

8. The optical waveguide of any of examples 1 through 7, wherein the input surface is oriented at an oblique angle relative to the plurality of internally reflective surfaces.

9. The optical waveguide of any of examples 1 through 8, wherein each of the input surface and the output surface is oriented at an oblique angle relative to the plurality of internally reflective surfaces.

10. The optical waveguide of any of examples 1 through 9, wherein the optical waveguide comprises a first wedge-shaped prism coupled to an input end of the substrate, and wherein the input surface is a first surface of the first wedge-shaped prism.

11. The optical waveguide of any of examples 1 through 10, wherein: the input surface is oriented at a first oblique angle relative to the plurality of internally reflective surfaces; and the first wedge-shaped prism has a second surface oriented at a second oblique angle relative to the plurality of internally reflective surfaces, wherein the second oblique angle is different from the first oblique angle.

12. The optical waveguide of any of examples 1 through 11, wherein the optical waveguide comprises a second wedge-shaped prism coupled to an output end of the substrate, and wherein the output surface is a first surface of the second wedge-shaped prism.

13. The optical waveguide of any of examples 1 through 12, wherein the substrate includes a plurality of internally reflective surfaces to cause the light of the plurality of colors to propagate through the substrate by total internal reflection, and wherein the input surface and the output surface are each substantially coplanar with at least one of the plurality of internally reflective surfaces.

14. The optical waveguide of any of examples 1 through 13, comprising a diffraction element that is part of the substrate and located on or proximate to the input surface to cause the light rays of the plurality of different colors to propagate collinearly through the substrate.

15. The optical waveguide of any of examples 1 through 14, comprising a diffraction element that is part of the substrate and located on or proximate to the output surface to cause the light rays of the plurality of different colors to be out-coupled collinearly from the optical waveguide.

16. The optical waveguide of any of examples 1 through 15, comprising a diffraction element that is part of the substrate and located on or proximate to a surface of the substrate between the input surface and the output surface, the diffraction element configured to cause light rays of at least one the plurality of different colors to be out-coupled from the optical waveguide at an intermediate location on the substrate between the input surface and the output surface.

17. The optical waveguide of any of examples 1 through 16, comprising a plurality of diffraction elements that are part of the substrate and located on or proximate to the input surface or the output surface, each of the diffraction gratings being configured to transmit light of a different color.

18. The optical waveguide of any of examples 1 through 17, wherein at least one the plurality of diffraction elements comprises a plurality of stacked diffraction elements.

19. A pupil relay comprising: a rigid, light-transmissive waveguide capable of conveying light rays of a plurality of different colors; and means for propagating the light rays of a plurality of different colors through the waveguide such that an exit pupil of the pupil relay has substantially identical size and shape as an entry pupil of the pupil relay and such that light rays input to the entry pupil and light rays output through the exit pupil have substantially identical chromatic properties.

20. A near-eye display device comprising: a light source; a microdisplay imager optically coupled to receive light from the light source; a first waveguide having an optical input port and an optical output port, the optical output port being disposed to output light to a light receptor of a user of the near-eye display device; and a second waveguide optically coupled to convey the light from the microdisplay imager to the input port of the first waveguide, the second waveguide including a light-transmissive substrate that includes a plurality of internally reflective surfaces to enable light rays of a plurality of different colors to propagate through the substrate by total internal reflection; an input surface to input, through an entry pupil of the second waveguide, input light rays of the plurality of different colors; and an output surface to output light rays of the plurality of different colors from the substrate through an exit pupil of the optical waveguide, the second waveguide having optical properties such that the entry pupil and exit pupil have substantially identical size and shape and such that the input light rays and output light rays have substantially identical chromatic properties.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An optical waveguide comprising:
  a light-transmissive substrate that includes a plurality of internally reflective surfaces to enable light rays of a plurality of different colors to propagate through the substrate by total internal reflection, the substrate having an input light transmission surface and an output light transmission surface;
  an input surface to receive input light rays of the plurality of different colors from an entry pupil of the optical waveguide;
  a first wedge-shaped prism to correct chromatic displacements of the light rays, the first wedge-shaped prism having a first outer surface corresponding to the input surface of the waveguide, and having a second outer surface optically coupled with the input light transmission surface of the substrate; and
  an output surface to output light rays of the plurality of different colors from the substrate through an exit pupil of the optical waveguide;
  wherein the output surface is parallel to the input surface;
  wherein the input surface and the output surface are oriented at a plurality of first oblique angles relative to the plurality of internally reflective surfaces;
  wherein the second outer surface of the first wedge-shaped prism and the input light transmission surface of the substrate are oriented at a second oblique angle relative to the plurality of internally reflective surfaces;
  wherein the input light rays and the output light rays propagate along a same direction that is parallel to the plurality of internally reflective surfaces; and wherein the optical waveguide has optical properties such that the entry pupil and exit pupil have substantially identical size and shape and such that the input light rays and output light rays have substantially identical chromatic properties.

2. The optical waveguide of claim 1, wherein the substrate is rigid.

3. The optical waveguide of claim 1, wherein the optical waveguide has physical dimensions such that the optical waveguide is suitable for use in a near-eye display device.

4. The optical waveguide of claim 1, wherein the optical waveguide has optical characteristics such that the light rays of the plurality of different colors propagate collinearly through the substrate.

5. The optical waveguide of claim 1, wherein the optical waveguide has optical characteristics such that the light rays of at least some of the plurality of different cobs propagate non-collinearly through the substrate.

6. The optical waveguide of claim 1, wherein the plurality of different colors include at least three colors of a primary color model.

7. The optical waveguide of claim 1, wherein the input surface is a first surface of the first wedge-shaped prism.

8. The optical waveguide of claim 7, wherein the second oblique angle is different from the plurality of first oblique angles.

9. The optical waveguide of claim 7, wherein the optical waveguide comprises a second wedge-shaped prism coupled to an output end of the substrate, and wherein the output surface is a first surface of the second wedge-shaped prism.

10. The optical waveguide of claim 1, wherein the input surface and the output surface are each substantially coplanar with at least one of the plurality of internally reflective surfaces.

11. The optical waveguide of claim 1, further comprising a diffraction element that is part of the substrate and located on or proximate to the input surface to cause the light rays of the plurality of different colors to propagate collinearly through the substrate.

12. The optical waveguide of claim 1, further comprising a diffraction element that is part of the substrate and located on or proximate to the output surface to cause the light rays of the plurality of different colors to be out-coupled collinearly from the optical waveguide.

13. The optical waveguide of claim 1, further comprising a plurality of diffraction elements that are part of the substrate and located on or proximate to the input surface or the output surface, each diffraction grating of the plurality of diffraction elements being configured to transmit light of a different color.

14. The optical waveguide of claim 13, wherein at least one of the plurality of diffraction elements comprises a plurality of stacked diffraction elements.

15. A pupil relay comprising:
a rigid, light-transmissive waveguide capable of conveying light rays of a plurality of different colors, the waveguide having an input surface to receive input light rays of the plurality of different colors, and an output surface to output output light rays of the plurality of different colors,
wherein the output surface is parallel to the input surface;
wherein the input surface and the output surface are oriented at a plurality of first oblique angles relative to a plurality of internally reflective surfaces of the waveguide;
wherein the input light rays and the output light rays propagate along a same direction that is parallel to the plurality of internally reflective surfaces;
a first wedge-shaped prism to correct chromatic displacements of the light rays, the first wedge-shaped prism having a first outer surface corresponding to the input surface of the waveguide, and having a second outer surface optically coupled with a input light transmission surface of the waveguide, wherein the second outer surface of the first wedge-shaped prism and the input light transmission surface of the waveguide are oriented at a second oblique angle relative to the plurality of internally reflective surfaces; and
means for propagating the light rays of a plurality of different colors through the waveguide such that an exit pupil of the pupil relay has substantially identical size and shape as an entry pupil of the pupil relay and such that light rays input to the entry pupil and light rays output through the exit pupil have substantially identical chromatic properties.

16. A near-eye display device comprising:
a light source;
a microdisplay imager optically coupled to receive light from the light source;
a first waveguide having an optical input port and an optical output port, the optical output port being disposed to output light to a light receptor of a user of the near-eye display device; and
a second waveguide optically coupled to convey the light from the microdisplay imager to the optical, input port of the first waveguide, the second waveguide including
a light-transmissive substrate that includes a plurality of internally reflective surfaces to enable light rays of a plurality of different colors to propagate through the substrate by total internal reflection, the substrate having an input light transmission surface and an output light transmission surface;
an input surface to receive, from an entry pupil of the second waveguide, input light rays of the plurality of different colors;
a first wedge-shaped prism to correct chromatic displacements of the light rays, the first wedge-shaped prism having a first outer surface corresponding to the input surface of the waveguide, and having a second outer surface optically coupled with the input light transmission surface of the light-transmissive substrate; and
an output surface to output output light rays of the plurality of different colors from the substrate through an exit pupil of the second waveguide;
wherein the output surface is parallel to the input surface;
wherein the input surface and the output surface are oriented at a plurality of first oblique angles relative to the plurality of internally reflective surfaces;
wherein the second outer surface of the first wedge-shaped prism and the input light transmission surface of the light-transmissive substrate are oriented at a second oblique angle relative to the plurality of internally reflective surfaces;
wherein the input light rays and the output light rays propagate along a same direction that is parallel to the plurality of internally reflective surfaces; and
wherein the second waveguide has optical properties such that the entry pupil and exit pupil have substantially identical size and shape and such that the input light rays and output light rays have substantially identical chromatic properties.

17. The pupil relay of claim 15, wherein the second oblique angle is different from the plurality of first oblique angles.

\* \* \* \* \*